United States Patent
Yamamoto

(10) Patent No.: US 6,767,031 B2
(45) Date of Patent: Jul. 27, 2004

(54) SEAT BELT CONTROL DEVICE AND METHOD

(75) Inventor: Yukiteru Yamamoto, Kanagawa (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 66 days.

(21) Appl. No.: 10/261,952

(22) Filed: Oct. 2, 2002

(65) Prior Publication Data
US 2003/0067154 A1 Apr. 10, 2003

(30) Foreign Application Priority Data
Oct. 5, 2001 (JP) ........................... 2001-309331

(51) Int. Cl.[7] .................... B60R 22/36; B60R 22/46
(52) U.S. Cl. ............... 280/806; 180/268; 242/390.8; 280/807
(58) Field of Search ................ 280/806, 807; 180/268, 282; 242/390.8, 390.9; 297/477, 480

(56) References Cited

U.S. PATENT DOCUMENTS 5,244,231 A  9/1993 Bauer et al.
5,788,281 A * 8/1998 Yanagi et al. ............. 280/806
2002/0024211 A1 * 2/2002 Yano et al. ................ 280/806

FOREIGN PATENT DOCUMENTS

| JP | 11334533 | 12/1999 |
| JP | P2001-318574 A | 11/2000 |
| JP | P2001-347923 A | 12/2001 |

* cited by examiner

Primary Examiner—Peter C. English
(74) Attorney, Agent, or Firm—McDermott Will & Emery LLP

(57) ABSTRACT

A seat belt control device is provided which comprises a drive motor connected to a seat belt for winding and unwinding the seat belt, a controller for controlling the drive motor, a wearing state sensor for detecting a wearing state of the seat belt, a vehicle speed sensor for detecting a vehicle speed, and a deceleration sensor for detecting deceleration of a vehicle. The controller shorts electrodes of the drive motor when the seat belt is worn, the vehicle speed is higher than a first predetermined vehicle speed value, and an absolute value of the deceleration of the vehicle is lower than an absolute value of a first predetermined deceleration value. A seat belt control method is also provided.

19 Claims, 4 Drawing Sheets

SEAT BELT CONTROL DEVICE AND METHOD

BACKGROUND OF THE INVENTION

The present invention relates to a seat belt control device and method, particularly of the kind that can dispense with a conventional seat belt locking mechanism by controlling a DC motor suitably thereby making a seat belt system smaller in size.

SUMMARY OF THE INVENTION

A seat belt system for vehicles is constructed so as to apply a tension to a seat belt by means of a seat belt retractor. In use of the seat belt system, a passenger pulls out a seat belt that is anchored to a vehicle body by two anchors and one through-anchor and engage a portion of the seat belt with a buckle fixed to a seat. Thereafter, when the passenger loosens his/her hold of the seat belt, the seat belt retractor retracts the slackened seat belt by the action of a spring and applies to the seat belt a tension that is determined by the spring thereby restraining the passenger in a seat.

Such a spring type seat belt system has a problem that it is necessary for the passenger to pull out the seat belt from the seat belt retractor against the bias of the spring and the seat belt system is unstable in operation since it utilizes the resilience of the spring.

To solve such a problem, it has been proposed a technique that realizes a seat belt system that is flexible in operation by using a DC motor for its seat belt drive section and controlling the rotational direction and speed of the DC motor as disclosed in Japanese Patent Provisional Publication No. 2000-318574.

SUMMARY OF THE INVENTION

With the seat belt system in which the DC motor is used in a seat belt retractor in place of a spring, it is necessary to lock the seat belt upon collision by means of a locking mechanism that is provided separately from the seat belt retractor.

However, the seat belt system with the seat belt retractor using the DC motor is larger in size as compared with a seat belt system with a seat belt retractor using a spring.

It is accordingly an object of the present invention to provide a seat belt control device that can dispense with a conventional seat belt locking mechanism by suitably controlling a DC motor and can make a seat belt system smaller in size.

To accomplish the above object, there is provided according to an aspect of the present invention, a seat belt control device comprising a drive motor connected to a seat belt for winding and unwinding the seat belt, a controller for controlling the drive motor, a wearing state sensor for detecting a wearing state of the seat belt, a vehicle speed sensor for detecting a vehicle speed, and a deceleration sensor for detecting deceleration of a vehicle, wherein the controller shorts electrodes of the drive motor when the seat belt is worn, the vehicle speed is higher than a first predetermined vehicle speed value, and an absolute value of the deceleration of the vehicle is lower than an absolute value of a first predetermined deceleration value.

There is provided according to another aspect of the present invention a seat belt control method comprising detecting a wearing state of the seat belt, detecting a vehicle speed, detecting deceleration of a vehicle, and controlling a drive motor for winding and unwinding a seat belt based on the wearing state of the seat belt, the vehicle speed and the deceleration of the vehicle, wherein the controlling comprises shorting electrodes of the drive motor when the seat belt is worn by a passenger, the vehicle speed is higher than a first predetermined vehicle speed value, and an absolute value of the deceleration of the vehicle is lower than an absolute value of a first predetermined deceleration value.

DESCRIPTION OF THE PREFERRED EMBODIMENT

Figure 1:
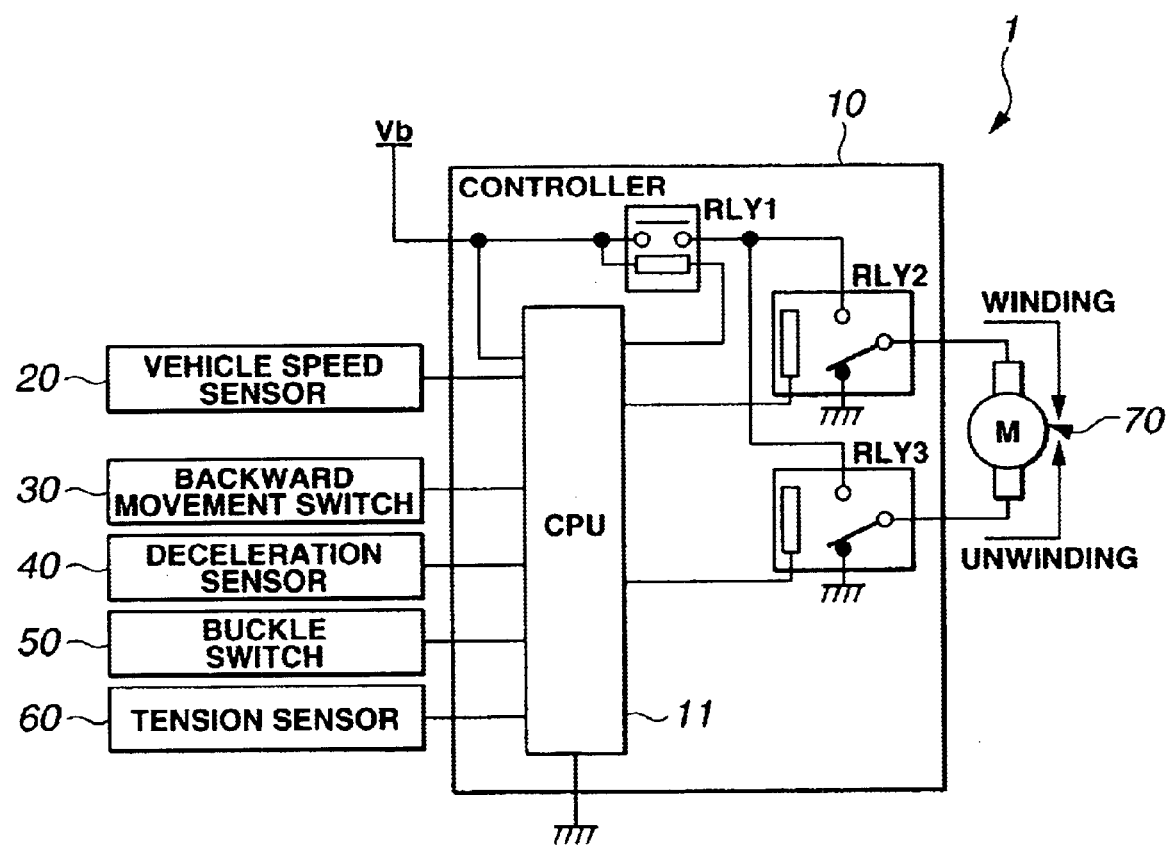
FIG. 1 is a block diagram of a seat belt control device according to an embodiment of the present invention.
Figure 2:
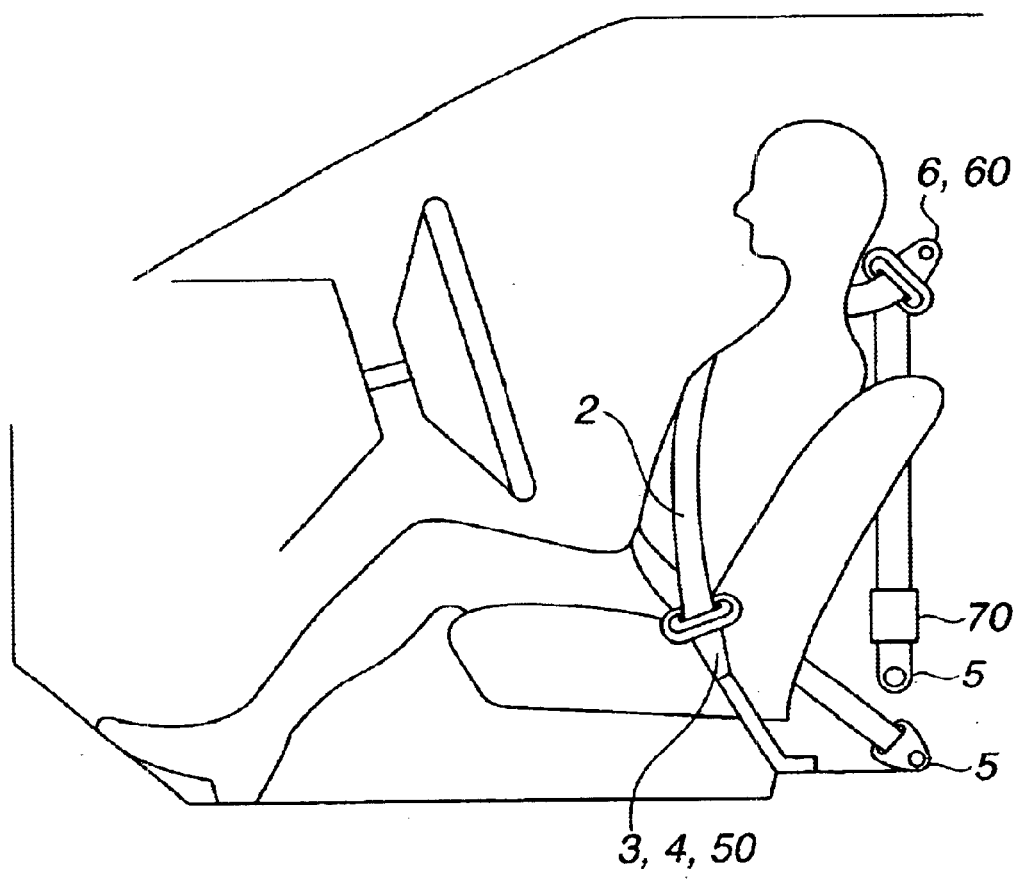
FIG. 2 is a schematic view for illustrating the positions of main sensors and a drive motor of the seat belt control device within a passenger compartment.

Referring to FIGS. 1 and 2, a seat belt control device according to an embodiment of the present invention is generally indicated by 1 and includes vehicle speed sensor 20, backward movement switch 30, deceleration sensor 40, buckle switch 50, tension sensor 60, drive motor 70, and controller 10.

Vehicle speed sensor 20 that is a vehicle speed detecting means detects the present vehicle speed and transmits detected vehicle speed data to CPU (Central Processing Unit) 11 of controller 10. Backward movement switch 30 that is a backward movement sensor or means detects a backward movement state of a vehicle, i.e., the direction of movement of the vehicle being backward and transmits detected backward movement state data to CPU 11. Deceleration sensor 40 that is a deceleration detecting means detects deceleration of the vehicle and transmits detected deceleration data to CPU 11. Buckle switch 50 that is a wearing state detecting sensor or means detects a wearing state of seat belt 2 by, e.g., detecting whether tongue plate 4 is engaged with buckle 3. Buckle switch 50 is turned on when seat belt 2 that is fixed to a vehicle body (no numeral) by two anchors 5 and one through-anchor 6 is engaged with buckle 3 fixed to a seat (no numeral), i.e., when seat belt 2 is worn or used by a passenger, and turned off when seat belt 2 is not engaged with buckle 3, i.e., when seat belt 2 is not worn by a passenger, thereby transmitting data on the wearing state of seat belt 2 to CPU 11. Tension sensor 60 detects the tension of seat belt 2 and transmits detected tension data to CPU 11. Drive motor 70 is driven to rotate under control of controller 10 and performs unwinding, winding and locking of seat belt 2.

Buckle switch 50 and tension sensor 60 are disposed inside a passenger compartment (no numeral) and adjacent the seat. As shown in FIG. 2, buckle switch 50 is disposed at a position where it can assuredly detect whether seat belt 2 is worn by the passenger or not, i.e., disposed inside buckle 3. Tension sensor 60 is disposed at a position where it can assuredly detect tension of seat belt 2, i.e., disposed inside through-anchor 6. Drive motor 70 is disposed inside the passenger compartment and adjacent the seat, i.e., adjacent one anchor 5 of seat belt 2 as shown in FIG. 2.

A seat belt system includes seat belt 2, buckle 3, tongue plate 4, anchors 5, 5, through-anchor 6 and seat belt control device 1, so that seat belt control device 1 is one of parts or elements constituting the seat belt system.

Controller 10 is a control means for controlling drive motor 70 and includes CPU 11, first relay RLY1, second relay RLY2 and third relay RLY3. First relay RLY1, second relay RLY2 and third relay RLY3 are connected as shown in FIG. 1 for switching supply of current Vb to drive motor 70.

As shown in FIG. 1, CPU 11 receives the vehicle speed data from vehicle speed sensor 20, the backward movement state data from backward movement switch 30, the deceleration data from deceleration sensor 40, the wearing state data from buckle switch 50, and the tension data from tension sensor 60, respectively. Based on those data, CPU 11 controls drive motor 70 by way of first relay RLY1, second relay RLY2 and third relay RLY3.

CPU 11 controls drive motor 70 so as to cause drive motor 70 to rotate in the direction to unwind or draw out seat belt 2 by turning first relay RLY1 on, second relay RLY2 off and third relay RLY3 on (hereinafter referred to as unwinding drive) and in the direction to wind or retract seat belt 2 by turning first relay RLY1 on, second relay RLY2 on and third relay RLY3 off (hereinafter referred to as winding drive). Further, by turning first relay RLY1 off, second relay RLY2 off and third relay RLY3 off, the electrodes of drive motor 70 are shorted to brake drive motor 70, thus making it possible to lock seat belt 2. Further, by turning first relay RLY1 off, second relay RLY2 off and third relay RLY3 on, the lock of drive motor 70 is canceled, thus making it possible to cancel a braking action of drive motor 70 and unlock seat belt 2.

In this manner, by utilizing the braking action caused by shorting the electrodes of drive motor 70, seat belt 2 can be locked, thus making it possible to dispense with the conventional locking mechanism. Accordingly, the seat belt system can be produced at lower cost and smaller in size.

Figure 3:
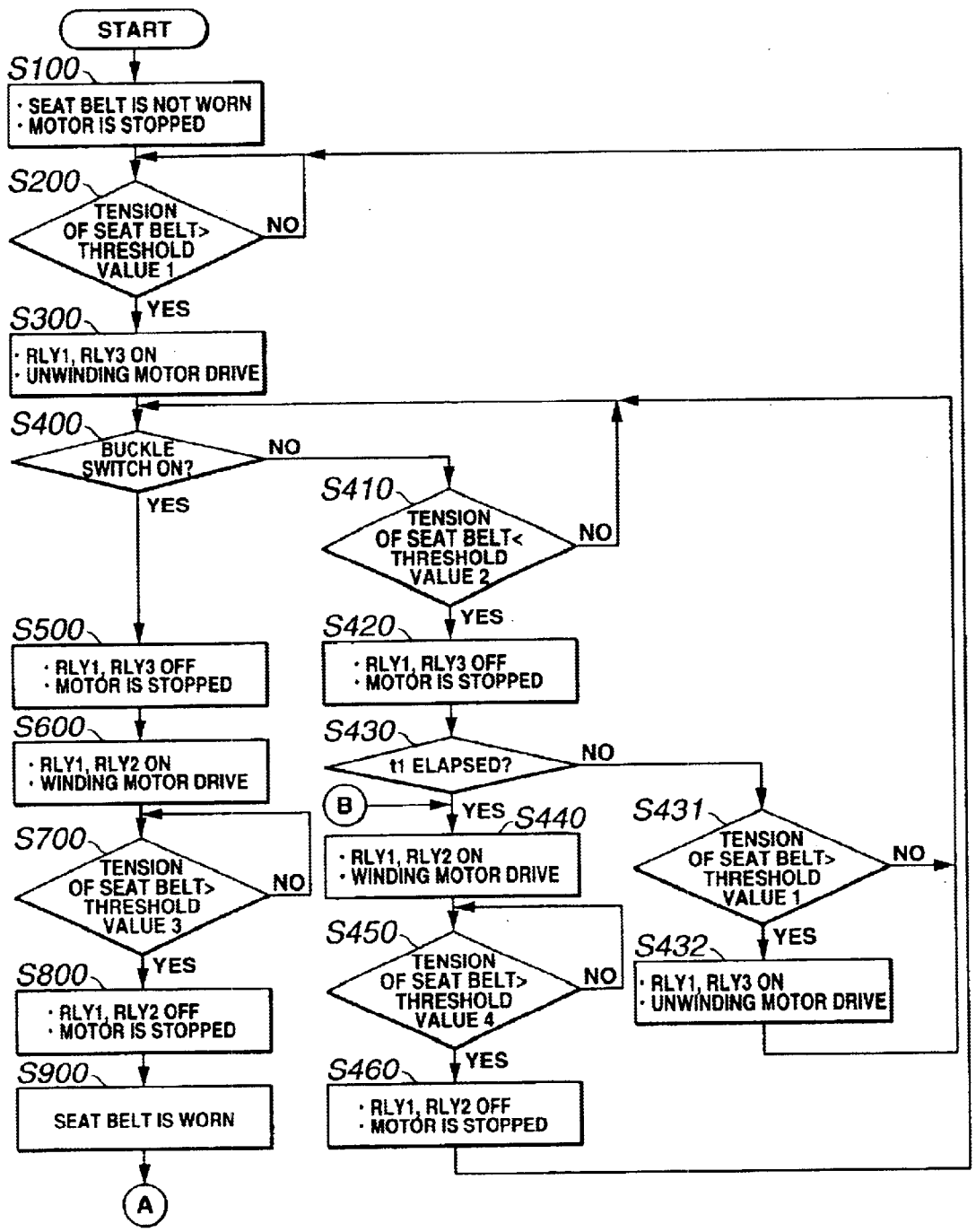
FIGS. 3 and 4 are flow charts of a control procedure executed by the seat belt control device.
Figure 4:
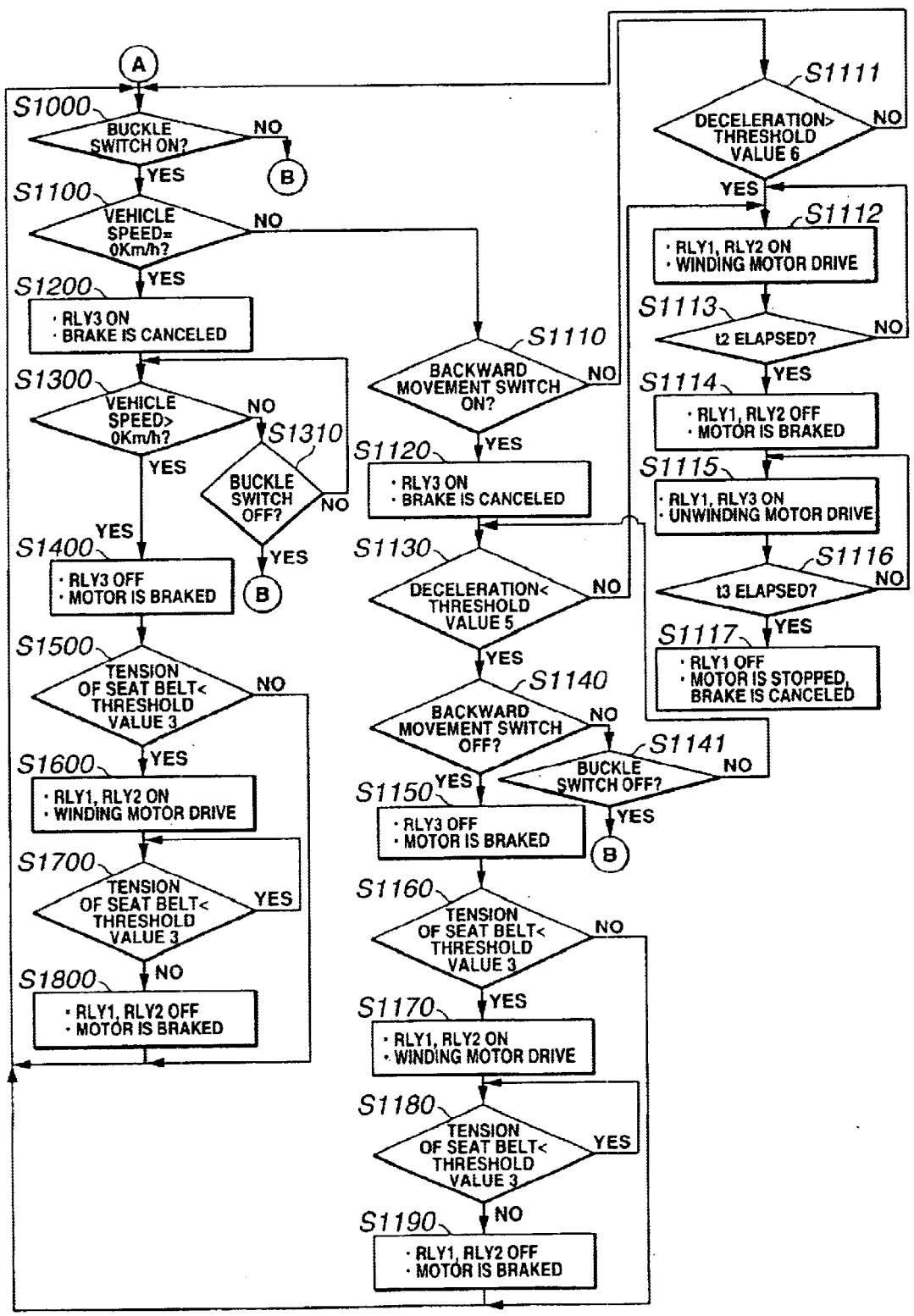

FIGS. 3 and 4 show a flowchart of a control procedure of drive motor 70 that is executed by CPU 11 of controller of seat belt control device 1 according to an embodiment of the present invention.

Referring to FIGS. 3 and 4, a control of drive motor 70 that is executed by CPU 11 of controller 10 will be described.

In the meantime, A in FIG. 3 is continued on A in FIG. 4 so that the program proceeds from A in FIG. 3 to A in FIG. 4, and each B in FIG. 4 is continued on B in FIG. 3 so that the program proceeds from each B in FIG. 4 to B in FIG. 3.

Description will first be made as to a control in steps S100 through S900 that is executed in case seat belt 2 is worn by a passenger, e.g., in case a passenger gets on a vehicle and wears seat belt 2 for restraining himself/herself in the seat.

In step S100 in FIG. 3, CPU 11 determines an initial condition, i.e., that seat belt 2 is not worn or used by a passenger based on the wearing state data transmitted from buckle switch 50, and turns all three relays off, i.e., first relay RLY1, second relay RLY2 and third relay RLY3 off thereby holding drive motor 70 stopped. Then, the program proceeds to step S200. In this condition, the electrodes of drive motor 70 are shorted so that drive motor 70 is braked and seat belt 2 is in a locked condition.

In step S200, CPU 11 makes a comparison between the tension data transmitted from tension sensor 60 and threshold value 1 that is a predetermined tension value of seat belt 2, i.e., it is determined whether the tension of seat belt 2 is larger than the threshold value 1. The comparison is repeated until the tension of seat belt 2 becomes larger than the threshold value 1, i.e., so long as the answer in step S200 is negative.

In step S200, if it is determined that the tension of seat belt 2 is larger than the threshold value 1, e.g., due to pulling out of seat belt 2 or the like action by a passenger (the answer in step S200 is affirmative), the program proceeds to step S300.

In step S300, CPU 11 turns first relay RLY1 on and third relay RLY3 on while holding second relay RLY2 off thereby allowing drive motor 70 to start the unwinding drive. Then, the program proceeds to step S400. By the unwinding drive of drive motor 70, the pulling out action by the passenger is assisted.

In step S400, it is determined by CPU 11 based on the wearing state data transmitted from buckle switch 50 whether seat belt 2 is worn by the passenger, i.e., whether buckle switch 50 is on. If it is determined that seat belt 2 is worn by the passenger (the answer in step S400 is affirmative), the program proceeds to step S500. The control that is executed if it is determined in step S400 that seat belt 2 is not worn by the passenger (the answer in step S400 is negative) will be described later.

In step S500, CPU 11 turns first relay RLY1 off and third relay RLY3 off while holding second relay RLY2 off thereby stopping drive motor 70, and the program proceeds to step S600. In this condition, the electrodes of drive motor 70 are shorted so that drive motor 70 is braked and seat belt 2 is in a locked condition. By stopping the unwinding drive of drive motor 70, it is finished to assist the passenger's action for pulling out seat belt 2.

In step S600, CPU 11 turns first relay RLY1 on and second relay RLY2 on while holding third relay RLY3 off thereby allowing drive motor 70 to start the winding drive, and the program proceeds to step S700.

In step S700, a comparison is made between the tension data transmitted from tension sensor 60 and a threshold value 3 that is a predetermined tension value of seat belt 2, i.e., it is determined whether the tension of seat belt 2 is larger than the threshold value 3. Herein, the comparison is repeated until the tension of seat belt 2 becomes larger than threshold value 3, i.e., so long as the answer in step S700 is negative. In the meantime, threshold value 3 is a tension value of seat belt 2 that can sufficiently restrain the passenger in the seat.

When it is determined in step S700 that the tension of seat belt 2 is larger than the threshold value 3 (the answer in step S700 is affirmative), the program proceeds to step S800. By the winding drive of drive motor 70 by the control in step S700, the passenger can be sufficiently restrained in the seat.

In step S800, CPU 11 turns first relay RLY1 off and second relay RLY2 off while holding third relay RLY3 off thereby stopping the winding drive of drive motor 70, since a desired tension of seat belt 2 for restraining the passenger in the seat has already been obtained by the control in step S700. Then, the program proceeds to step S900. In this condition, the electrodes of drive motor 70 are shorted so that drive motor 70 is braked and seat belt 2 is in a locked condition. By the control in step S800, it becomes possible to keep the passenger restrained in the seat with an optimal tension.

In the control in steps S600 through S800, CPU 11 rotates drive motor 70.in the direction to wind seat belt 2 based on the tension data detected by tension sensor 60. By this, it becomes possible to feed the detected tension data back to the control of drive motor 70, thus making it possible to obtain an optimal tension of seat belt 2 for assuredly restraining the passenger in the seat.

In step S900, CPU 11 determines, based on the wearing state data, that seat belt 2 is worn by the passenger. Then, the program proceeds to step S1000.

By the control of drive motor 70 in steps S100 through S900 that is executed by CPU 11 of controller 10, an action after the passenger gets on the vehicle and before the passenger wears seat belt 2 can be attained.

Hereinafter, the control in steps S410 through S432 that is executed when it is determined in step S400 that seat belt 2 is not worn by the passenger (the answer in step S400 is negative), e.g., when the passenger gets on the vehicle and starts wearing seat belt 2 but stops a wearing action once and thereafter starts the wearing action again will be described.

If it is determined in step S400, based on the wearing state data transmitted from buckle switch 50, that seat belt 2 is not worn by the passenger (the answer in step S400 is negative), the program proceeds to step S410. In step S410, a comparison between the tension data and threshold value 2 that is a predetermined tension value is made, i.e., it is determined whether the tension of seat belt 2 is smaller than the threshold value 2. If the tension data is equal to or larger than threshold value 2, the program returns to step S400. In this connection, the reason why a comparison between the tension data and threshold value 2 is made is for determining the state of seat belt 2 when, for example, the passenger starts pulling out seat belt 2 but stops a pulling out action once.

In the meantime, either of the above described threshold value 1 and threshold value 2 indicates a predetermined tension value when drive motor 70 performs the unwinding drive. The threshold value 1 is a predetermined tension value based upon which CPU 11 determines whether to start the unwinding drive when the passenger starts puling out seat belt 2. The threshold value 2 is a predetermined tension value based upon which CPU 11 determines whether the passenger is continuing an action for wearing seat belt 2, i.e., whether to continue the unwinding drive of drive motor 70. Accordingly, it is desirable to set the threshold value 1 larger than the threshold value 2.

If it is determined in step S410 that the tension of seat belt 2 is smaller than the threshold value 2 (the answer in step S410 is affirmative), the program proceeds to step S420. In step S420, CPU 11 turns first relay RLY1 off and third relay RLY3 off while holding second relay RLY2 off thereby stopping the winding drive of drive motor 70. Then, the program proceeds to step S430. By stopping the winding drive of drive motor 70, it is finished to assist an action of pulling out seat belt 2. In this condition, the electrodes of drive motor 70 are shorted so that drive motor 70 is braked and seat belt 2 is in a locked condition.

In step S430, it is determined whether a predetermined time t1 has elapsed after stopping of the unwinding drive of drive motor 70.

In step S430, if it is determined that the predetermined time t1 has not elapsed after stopping of the unwinding drive of drive motor 70 and seat belt 2 is not worn by the passenger (the answer in step S430 is negative), the program proceeds to step S431.

In step S431, CPU 11 makes a comparison between the tension data and the threshold value 1 that is a predetermined tension value, i.e., it is determined whether the tension of seat belt 2 is larger than the threshold value 1. If it is determined by this comparison that the tension of seat belt 2 is smaller than the threshold value 1 (the answer in step S431 is negative), the program returns to step S400 since the passenger is not doing an action of pulling out seat belt 2. In step S400, a comparison for determining whether seat belt 2 is worn by the passenger is made again based on the wearing data transmitted from buckle switch 50.

If it is determined in step S431 that the tension of seat belt 2 is larger than the threshold value 1 (the answer in step S431 is affirmative), the program proceeds to step S432 since the passenger is doing an action of drawing out seat belt 2. In step S432, CPU 11 turns first relay RLY1 on and third relay RLY3 on while holding second relay off thereby starting the unwinding drive of drive motor 70 again to assist the action of pulling out seat belt 2 by the passenger. After the unwinding drive is started again, the program proceeds to step S400 for the normal wearing procedure for seat belt 2.

By the control of drive motor 70 in steps S410 through S432 by CPU 11, a wearing action in case, for example, the passenger gets on the vehicle and starts a wearing action but stops it halfway and thereafter starts the wearing action again is attained.

Hereinafter, description will be made as to the control in steps S410 through S460 that is executed if it is determined in step S400 that seat belt 2 is not worn by the passenger (the answer in step S400 is negative), e.g., when the passenger gets on the vehicle and starts wearing seat belt 2 but stops a wearing action halfway.

If it is determined in step S400 based on the wearing data transmitted from buckle switch 50 that seat belt 2 is not worn by the passenger (the answer in step S400 is negative), the program proceeds to step S410. If it is determined in step S410 that the tension of seat belt 2 is smaller than the threshold value 2 (the answer in step 410 is affirmative), the program proceeds to step S420. In step S420, CPU 11 turns first relay RLY1 off and third relay RLY3 off while holding second relay RLY2 off thereby stopping the unwinding drive of drive motor 70. Then, the program proceeds to step S430. In this condition, the electrodes of drive motor 70 are shorted so that drive motor 70 is braked and seat belt 2 is in a locked condition.

In step S430, if it is determined based on the wearing data transmitted from buckle switch 50 after lapse of a predetermined time t1 after the unwinding drive of drive motor 70 is stopped that seat belt 2 is not worn by the passenger (the answer in step S430 is affirmative), CPU 11 turns first relay RLY1 on and second relay RLY2 on while holding third relay RLY3 off thereby starting the winding drive of drive motor 70. Then, the program proceeds to step S450. By the winding drive of drive motor 70, seat belt 2 is retracted and stored in place.

Then, in step S450, CPU 11 makes a comparison between the tension data transmitted from tension sensor 60 and a threshold value 4 that is a predetermined tension value, i.e., it is determined whether the tension of seat belt 2 is larger than the threshold value 4. If the tension of seat belt 2 is smaller than the threshold value 4 (the answer in step S450 is negative), the comparison is repeated. By this comparison, it is determined whether retraction of seat belt 2 by the winding drive of drive motor 70 is completed.

In the meantime, while the threshold value 3 and the threshold value 4 represent predetermined tension values of seat belt 2 when drive motor 70 is made to perform the winding drive, the threshold value 3 is a predetermined tension value based on which it is determined whether the winding drive of drive motor 70 for restraining the passenger in the seat sufficiently can be stopped. In contrast to this, the threshold value 4 is a predetermined tension value based on which it is determined whether the winding drive of drive motor 70 for retracting and storing seat belt 2 in case seat belt 2 is not worn by the passenger. Accordingly, it is desired that the threshold value 4 is always set larger than the threshold value 3.

If it is determined in step S450 that retraction and storage of seat belt 2 by the winding drive of drive motor 70 is completed and the tension of seat belt 2 is larger than the threshold value (the answer in step S450 is affirmative), the program proceeds to step S460. In step S460, CPU 11 turns first relay RLY1 off and second relay RLY2 off while holding third relay RLY3 off thereby stopping drive motor 70. Then, the program proceeds to step S200 where it is waited for that the passenger starts an action of wearing seat belt 2. In this condition, the electrodes of drive motor 70 are shorted so that drive motor 70 is braked and seat belt 2 is in a locked condition.

By the control in steps S410 through S460 by drive motor 70, a passenger's action of, for example, getting on the vehicle and starting wearing seat belt 2 but stopping a wearing action halfway can be attained.

In the meantime, the control steps S440 through S460 can also be applied to the case, for example, the passenger who is wearing seat belt 2 takes seat belt 2 off.

Hereinafter, with reference to steps S1000 through S1800 in FIG. 4, the control in seat belt control device 1 in case seat belt 2 is worn by the passenger and the vehicle is stopped will be described.

In step S1000 in FIG. 4, CPU 11 determines based on the wearing state data transmitted from buckle switch 50 whether seat belt 2 is worn by the passenger, i.e., it is determined whether buckle switch 50 is on. If it is determined in step S1000 that seat belt 2 is not worn by the passenger (the answer in step S1000 is negative), the program proceeds to B in FIG. 3, i.e., step S440 in FIG. 3. In accordance with the procedure from step S440 onward, an operation for storing seat belt 2 by the winding drive of drive motor 70 in case seat belt 2 is not worn by the passenger is performed.

If it is determined in step S1000 that seat belt 2 is worn by the passenger (the answer in step S1000 is affirmative), the program proceeds to step S1100.

In step S1100, CPU 11 determines based on the vehicle speed data that indicates a present vehicle speed and that is always detected by and transmitted from vehicle speed sensor 20 whether the vehicle speed is lower than a first predetermined vehicle speed value. In this embodiment, it is determined whether the vehicle speed is equal to 0 (zero), i.e., whether the vehicle is running. If the vehicle speed is not zero (the answer in step S1100 is negative), i.e., the vehicle is running, the program proceeds to step S1110. In the meantime, the procedure from step S1110 onward will be described later.

If it is determined in step S110 that the vehicle speed is equal to zero (the answer in step S1100 is affirmative), i.e., the vehicle is stopping, the program proceeds to step S1200 where CPU turns third relay RLY3 on while holding first relay RLY1 off and second relay RLY2 off. Then, the program proceeds to step S1300. In this instance, the short of the electrodes of drive motor 70 is canceled thereby canceling the brake of drive motor 70 and the lock of seat belt 2.

By the control in steps S1000 through S1200, an action of the passenger, e.g., leaning forward of the passenger to look right and left when the vehicle comes in a street intersection and once stops is not obstructed by canceling the lock of seat belt 2.

In step S1300, CPU 11 determines based on the vehicle speed data transmitted from vehicle speed sensor 20 whether the vehicle speed is higher than a second predetermined vehicle speed value, e.g., whether the vehicle speed is higher than zero, i.e., whether the vehicle is running. If the vehicle speed is equal to zero (the answer in step S1300 is negative), the program proceeds to step S1310.

In step S1310, it is determined based on the wearing state data transmitted from buckle switch 50 whether seat belt 2 is worn by the passenger, i.e., it is determined whether buckle switch 50 is off. If it is determined in step S1310 that seat belt 2 is worn by the passenger (the answer in step S1310 is negative), the program returns to step S1300 where it is determined again whether the vehicle is running. Further, if it is determined in step S1310 that seat belt 2 is not worn by the passenger (the answer in step S1310 is affirmative), the program proceeds to B in FIG. 3, i.e., step S440 in FIG. 3 in order to perform an operation of storing seat belt 2 by the winding drive of drive motor 70 in accordance with the procedure from step S440 onward.

If it is determined in step S1300 of FIG. 4 that the vehicle speed is not equal to zero (the answer in step S1300 is affirmative), the program proceeds to step S1400 where CPU 11 turns third relay RLY3 off while holding first relay RLY1 off and second relay RLY2 off. Then, the program proceeds to step S1500. In this condition, the electrodes of drive motor 70 are shorted so that drive motor 70 is braked and seat belt 2 is in a locked condition.

In the meantime, by setting the second predetermined vehicle speed value in step S1300 to a low speed value for the vehicle to go slowly (e.g., 5 Km/h), the passenger can lean forward to look right and left when the vehicle is going slowly at a street intersection.

In step S1500, CPU 11 makes a comparison between the tension data transmitted from tension sensor 60 and the threshold value 3, i.e., it is determined whether the tension of seat belt 2 is smaller than the threshold value 3. If the tension of seat belt 2 is larger than the threshold value 3 (the answer in step S1500 is negative), the program returns to step S1000 since the tension of seat belt 2 is sufficient for restraining the passenger in the seat.

If it is determined in step S1500 that the tension of seat belt 2 is smaller than the threshold value 3 (the answer in step S1500 is affirmative), the program proceeds to step S1600 where CPU 11 turns first relay RLY1 on and second relay RLY2 on while holding third relay RLY3 off thereby starting the winding drive of drive motor 70. Then, the program proceeds to step S1700.

In step S1700, CPU 11 makes a comparison between the tension data transmitted from tension sensor 60 and the threshold value 3, i.e., it is determined whether the tension of seat belt 2 is smaller than the threshold value 3. If the tension of seat belt 2 is smaller than the threshold value 3 (the answer in step S1700 is affirmative), the comparison is repeated. By the winding drive of drive motor 70 by the control in step S1600 due to the repetition of step S1700, it becomes possible to restrain the passenger in the seat securely.

If it is determined in step S1700 that the tension of seat belt 2 is larger than the threshold value 3 (the answer in step S1700 is negative), the program proceeds to step S1800. In step S1800, CPU 11 turns first relay RLY1 off and second relay RLY2 off while holding third relay RLY3 off thereby stopping the winding drive of drive motor 70. Then, the program returns to step S1000. In this condition, the electrodes of drive motor 70 are shorted so that drive motor 70 is braked and seat belt 2 is in a locked condition. By the control in step S1800, it becomes possible to keep the passenger restrained in the seat with an optimal tension.

In the control in steps S1600 through S1800, CPU 11 rotates drive motor 70 in the direction to wind seat belt 2, based on the tension data detected by tension sensor 60, thereby making it possible to feed the detected tension data back to the control of drive motor 70 and therefore making it possible to attain an optimal tension for restraining the passenger in the seat assuredly.

Further, by the control in steps S1000 through S1800, it becomes possible to allow seat belt 2 to be slackened once so as not to obstruct an action of the passenger when the vehicle goes in an intersection and stops once or goes slowly to pass the intersection and makes higher once again the tension of thus slackened seat belt 2 thereby restraining the passenger in the seat.

Hereinafter, the control procedure in steps S1110 through S1190 by CPU 11 when the vehicle is driven to move backward is described.

If it is determined in step S1100 based on the vehicle speed data transmitted from vehicle speed sensor 20 that the vehicle speed is not zero (the answer in step S1100 is negative), the program proceeds to step S1110 where it is determined by CPU 11 based on backward movement state data that is the data on the direction of movement of the vehicle and that is always detected by and transmitted from backward movement switch 50 whether the direction of movement of the vehicle is backward, i.e., it is determined whether backward movement switch 30 is on. If it is determined that the direction of movement of the vehicle is not backward (the answer in step S1110 is negative), i.e., it is determined that the direction of movement of the vehicle is forward, the program proceeds to step S1111. In the meantime, the procedure from step S1111 onward by CPU 11 will be described later.

If it is determined in step S1110 that the direction of movement of the vehicle is backward (the answer in step S1110 is affirmative), the program proceeds to step S1120 where CPU turns third relay RLY3 on while holding first relay RLY1 off and second relay RLY2 off thereby canceling the short of the electrodes and therefore the brake of drive motor 70. Then, the program proceeds to step S1130. By the operation in Step S1120, seat belt 2 that restrains the passenger in the seat is loosened, e.g., the lock of seat belt 2 is cancelled at the time of backward movement so as not to obstruct turning back of the passenger since at backward movement of the vehicle the passenger turns back to make a judgment with the eye.

In step S1130, CPU 11 makes a comparison between the absolute value of deceleration data that is the deceleration of the vehicle and that is always detected by and transmitted from deceleration sensor 40 and a threshold value 5 that is an absolute value of a first predetermined deceleration value, i.e., it is determined whether the absolute value of deceleration of the vehicle is smaller than the threshold value 5. If it is determined that the absolute value of the deceleration of the vehicle is larger than the threshold value 5 (the answer in step S1130 is negative), the program proceeds to step S1112. In this connection, it is considered that such determination may be applicable to the case where a collision is caused during backward movement of the vehicle. In the meantime, the procedure from step S1112 onward will be described later.

If it is determined in step S1130 that the absolute value of the deceleration of the vehicle is smaller than the threshold value 5 (the answer in step S1130 is affirmative), a collision or the like has not occurred during backward movement. Then, the program proceeds to step S1140.

In step S1140, it is determined by CPU 11 based on the backward movement state data transmitted from backward movement switch 30 whether the direction of movement of the vehicle is backward, i.e., it is determined whether backward movement switch 30 is off. If it is determined that the direction of movement of the vehicle is backward (the answer in step S1140 is negative), the program proceeds to step S1141.

In step S1141, it is determined based on the wearing state data transmitted from buckle switch 50 whether seat belt 2 is worn by the passenger, i.e., it is determined whether buckle switch 50 is off. If it is determined that seat belt 2 is not worn by the passenger (the answer in step S1141 is affirmative), the program proceeds to B of FIG. 3, i.e., step S440 in FIG. 3, an operation of storing seat belt 2 by the winding rotation drive of drive motor 70 is performed in accordance with the procedure from step S440 onward.

If it is determined in step S1141 that seat belt 2 is worn by the passenger (the answer in step S1141 is negative), it is determined that backward movement of the vehicle is continuing and the program returns to step S1130.

If it is determined in step S1140 that the direction of movement of the vehicle is not backward (the answer in step S1140 is affirmative), i.e., backward movement of the vehicle is finished, the program proceeds to step S1150.

In step S1150, CPU 11 turns third relay RLY3 off while holding first relay RLY1 off and second relay RLY2 off. Then, the program proceeds to step S1160. In this condition, the electrodes of drive motor 70 are shorted so that drive motor 70 is braked and the seat belt 2 is in a locked condition.

In step S1160, CPU 11 makes a comparison between the tension data transmitted from tension sensor 60 and the threshold value 3, i.e., it is determined whether the tension of seat belt 2 is smaller than the threshold value 3. If it is determined that the tension of seat belt 2 is larger than the threshold value 3 (the answer in step S1160 is negative), the program proceeds to step S1000 in FIG. 4 since the tension of seat belt 2 is sufficient for restraining the passenger in the seat.

If it is determined in step S1160 that the tension of seat belt 2 is smaller than the threshold value 3 (the answer in step S1160 is affirmative), the program proceeds to step S1170.

In step S1170, CPU 11 turns first relay RLY1 on and second relay RLY2 on while holding third relay RLY3 off thereby starting the winding drive of drive motor 7. Then, the program proceeds to step S1180.

In step S1180, CPU 11 makes a comparison between the tension data transmitted from tension sensor 60 and the threshold value 3, i.e., it is determined whether the tension of seat belt 2 is smaller than the threshold value 3. If the tension of seat belt 2 is smaller than the threshold value 3 (the answer in step S1180 is affirmative), the comparison is repeated. By the repetition of step S1180, CPU 11 rotates drive motor 70 in the direction to wind seat belt 2 based on the tension data detected by tension sensor 60 thereby making it possible to restrain the passenger in the seat sufficiently.

If it is determined in step S1180 that the tension of seat belt 2 is larger than the threshold value 3 (the answer in steep S1180 is negative), the program proceeds to step S1190.

In step S1190, CPU 11 turns first relay RLY1 off and second relay RLY2 off while holding third relay RLY3 off thereby stopping the winding drive of drive motor 70. Then, the program returns to step S1000. In this condition, the electrodes of drive motor 70 are shorted so that drive motor 70 is braked and seat belt 2 is in a locked condition. By the control in step S1190, it becomes possible to restrain the passenger in the seat with an optimal tension.

By the control in steps S1150 through S1190, CPU 11 causes drive motor 70 to rotate in the direction to wind seat belt 2 based on the tension data detected by tension sensor 60 thereby making it possible to feed the tension data back to the control of drive motor 70 and therefore making it possible to attain an optimal tension of seat belt 2 for restraining the passenger in the seat assuredly.

Further, by the control in steps S1110 through S1190, it becomes possible to loosen seat belt 2 once at backward movement of the vehicle so as not obstruct an action of the passenger and make higher the tension of seat belt 2 again after backward movement of the vehicle is finished for thereby restraining the passenger in the seat.

Hereinafter, description will be made as to steps S1111 through S1117 for the control in case, for example, rapid deceleration is detected during running of the vehicle with seat belt 2 being worn.

If it is determined in step S1110 based on the backward movement data transmitted from backward movement switch 50 that the direction of movement of the vehicle is not backward (the answer in step s1110 is negative), the program proceeds to step S1111.

In step S1111, CPU 11 makes a comparison between the absolute value of the deceleration data always detected by and transmitted from deceleration sensor 40 and a threshold value 6 that is an absolute value of a second predetermined deceleration value, i.e., it is determined whether the absolute value of the deceleration of the vehicle is larger than the absolute value of the threshold value 6. If it is determined that the absolute value of the deceleration of the vehicle is smaller than the absolute value of the threshold value 6 (the answer in step S1111 is negative), the program returns to step S1000. In this connection, it is desirable that the absolute value of the second predetermined deceleration value is always larger than the threshold value 5 that is the first predetermined deceleration value.

In the meantime, by the procedure from step S1000 to S1111 and the procedure from step S1000 to step S1190 by way of step S1110, with seat belt 2 being worn and at normal running of the vehicle at the speed higher than a predetermined value and not accompanied by any deceleration the absolute value of which is higher than a predetermined value, all of first relay RLY1, second relay RLY2 and third relay RLY3 are in principle off, thus causing the electrodes of drive motor 70 to be shorted so that drive motor 70 is braked and seat belt 2 is always locked.

In step S1111, if it is determined that the absolute value of the deceleration of the vehicle is larger than the absolute value of the threshold value 6 (the answer in step S1111 is affirmative), the program proceeds to step S1112.

In step S1112, CPU 11 turns first relay RLY1 on and second relay RLY2 on while holding third relay RLY3 off thereby starting the winding drive of drive motor 70. Then, the program proceeds to step s1113.

In step S1113, it is determined by CPU 11 whether predetermined time t2 has elapsed after start of the winding drive of drive motor 70. The control in step S1112 is repeated until it is determined in step S1113 that predetermined time t2 has elapsed after start of the winding drive of drive motor 70, i.e., so long as the answer in step s1113 is negative.

In this manner, in case a collision or the like that is accompanied by large deceleration occurs, it becomes possible to obtain a lock keeping force for keeping seat belt 2 locked, that is nearly equal to that of a conventional locking mechanism.

If it is determined in step S1113 that predetermined time t2 has elapsed after start of the winding rotation drive of drive motor 70 (the answer in step S1113 is affirmative), the program proceeds to step S1114.

In step S1114, CPU 11 turns first relay RLY1 off and second relay RLY2 off while holding third relay off thereby stopping the winding drive of drive motor 70. Then, the program proceeds to step S1115. In this condition, the electrodes of drive motor 70 are shorted so that drive motor 70 is braked and seat belt 2 is in a locked condition.

In step S1115, CPU 11 turns first relay RLY1 on and third relay RLY3 on while holding second relay RLY2 off thereby staring the unwinding drive of drive motor 70. Then, the program proceeds to step S1116.

In step S1116, it is determined whether predetermined time t3 has elapsed after start of the unwinding rotation drive of drive motor 70. The control in step S1115 is repeated until it is determined in step 1116 that predetermined time t3 has elapsed after start of the unwinding drive of drive motor 70, i.e. so long as the answer in step S1116 is negative.

By the control in steps S1115 and S1116, it becomes possible to make drive motor 70 perform the unwinding drive thereby loosening seat belt 2 for making ready for the passenger to get out of the vehicle.

If it is determined in step S1116 that predetermined time t3 has elapsed after start of the unwinding drive of drive motor 70 (the answer in step S1116 is affirmative), the program proceeds to step S1117.

In step S1117, CPU 11 turns first relay RLY1 off while holding third relay RLY3 on and second relay RLY2 off thereby stopping drive motor 70 and canceling the brake of drive motor 70. Accordingly, in this condition, seat belt 2 is not locked, thus making it possible for the passenger to get out of the vehicle rapidly when a collision accompanied by large deceleration occurs.

By the control in steps from S1111 to S1117, it becomes possible to obtain a lock keeping force for keeping seat belt 2 locked by making drive motor perform the winding drive when a collision accompanied by large deceleration occurs and for the passenger to get out of the vehicle rapidly by making drive motor 70 rotate in the reverse direction to perform the unwinding drive after lapse of a predetermined time thereby loosening seat belt 2 and canceling the lock of seat belt 2.

Further, in case it is determined in step S1130 that the absolute value of the deceleration of the vehicle is larger than the threshold value 5, it becomes possible to obtain a lock keeping force for keeping seat belt 2 locked that is equal to that of the conventional locking mechanism, by the control in steps S1111 through S1117 and for the passenger to get out of the vehicle rapidly by loosening seat belt 2 after lapse of a predetermined time and canceling the lock of seat belt 2.

The entire contents of Japanese Patent Application P2001-309331 are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A seat belt control device comprising:
    a drive motor connected to a seat belt for winding and unwinding the seat belt;
    a controller for controlling the drive motor;
    a wearing state sensor for detecting a wearing state of the seat belt;
    a vehicle speed sensor for detecting a vehicle speed; and
    a deceleration sensor for detecting deceleration of a vehicle;
    wherein the controller shorts electrodes of the drive motor when the seat belt is worn, the vehicle speed is higher than a first predetermined vehicle speed value, and an absolute value of the deceleration of the vehicle is lower than an absolute value of a first predetermined deceleration value.

2. A seat belt control device according to claim 1, wherein the controller cancels a short of the electrodes of the drive motor when the seat belt is worn and the vehicle speed is lower than or equal to the first predetermined vehicle speed value.

3. A seat belt control device according to claim 2, further comprising a tension sensor for detecting a tension of the seat belt, wherein the controller rotates the drive motor in the direction to wind the seat belt based on the tension of the seat belt after the short of the electrodes of the drive motor is canceled.

4. A seat belt control device according to claim 1, further comprising a backward movement sensor for detecting backward movement of the vehicle, wherein the controller cancels a short of the electrodes of the drive motor when the seat belt is worn, the vehicle speed is higher than the first predetermined vehicle speed value, and the direction of movement of the vehicle is backward.

5. A seat belt control device according to claim 4, further comprising a tension sensor for detecting a tension of the seat belt, wherein the controller rotates the drive motor in the direction to wind the seat belt based on the tension of the seat belt after the short of the electrodes of the drive motor is canceled.

6. A seat belt control device according to claim 4, wherein the controller rotates the drive motor in the direction to wind the seat belt when the seat belt is worn, the vehicle speed is higher than the first predetermined vehicle speed value, the direction of movement of the vehicle is backward, and the absolute value of deceleration of the vehicle is larger than the absolute value of the first predetermined deceleration value.

7. A seat belt control device according to claim 6, wherein the controller rotates the drive motor in the direction to unwind the seat belt after having rotated the drive motor in the direction to wind the seat belt for a predetermined time.

8. A seat belt control device according to claim 4, wherein the controller rotates the drive motor in the direction to wind the seat belt when the seat belt is worn, the vehicle speed is higher than the first predetermined vehicle speed value, the direction of movement of the vehicle is not backward, and the absolute value of deceleration of the vehicle is larger than a second predetermined deceleration value that is larger than the first predetermined deceleration value.

9. A seat belt control device according to claim 8, wherein the controller rotates the drive motor in the direction to unwind the seat belt after having rotated the drive motor in the direction to wind the seat belt for a predetermined time.

10. A seat belt control device comprising:
a drive motor connected to a seat belt for winding and unwinding the seat belt;
control means for controlling the drive motor;
wearing state detecting means for detecting a wearing state of the seat belt;
vehicle speed detecting means for detecting a vehicle speed; and
deceleration detecting means for detecting deceleration of a vehicle;
the control means shorting electrodes of the drive motor when the seat belt is worn, the vehicle speed is higher than a first predetermined vehicle speed value, and an absolute value of the deceleration of the vehicle is lower than an absolute value of a first predetermined deceleration value.

11. A seat belt control method comprising:
detecting a wearing state of a seat belt;
detecting a vehicle speed;
detecting deceleration of a vehicle; and
controlling a drive motor for winding and unwinding the seat belt based on the wearing state of the seat belt, the vehicle speed and the deceleration of the vehicle;
wherein the controlling comprises shorting electrodes of the drive motor when the seat belt is worn, the vehicle speed is higher than a first predetermined vehicle speed value, and an absolute value of the deceleration of the vehicle is lower than an absolute value of a first predetermined deceleration value.

12. A seat belt control method according to claim 11, wherein the controlling further comprises canceling a short of the electrodes of the drive motor when the seat belt is worn and the vehicle speed is lower than or equal to the first predetermined vehicle speed value.

13. A seat belt control method according to claim 12, further comprising detecting a tension of the seat belt, wherein the controlling further comprises rotating the drive motor in the direction to wind the seat belt based on the tension of the seat belt after the short of the electrodes of the drive motor is canceled.

14. A seat belt control method according to claim 11, further comprising detecting backward movement of the vehicle, wherein the controlling further comprises canceling a short of the electrodes of the drive motor when the seat belt is worn, the vehicle speed is higher than the first predetermined vehicle speed value, and the direction of movement of the vehicle is backward.

15. A seat belt control method according to claim 14, further comprising detecting a tension of the seat belt, wherein the controlling further comprises rotating the drive motor in the direction to wind the seat belt based on the tension of the seat belt after the short of the electrodes of the drive motor is canceled.

16. A seat belt control method according to claim 14, wherein the controlling further comprises rotating the drive motor in the direction to wind the seat belt when the seat belt is worn, the vehicle speed is higher than the first predetermined vehicle speed value, the direction of movement of the vehicle is backward, and the absolute value of deceleration of the vehicle is larger than the absolute value of the first predetermined deceleration value.

17. A seat belt control method according to claim 16, wherein the controlling further comprises rotating the drive motor in the direction to unwind the seat belt after having rotated the drive motor in the direction to wind the seat belt for a predetermined time.

18. A seat belt control method according to claim 14, wherein the controlling further comprises rotating the drive motor in the direction to wind the seat belt when the seat belt is worn, the vehicle speed is higher than the first predetermined vehicle speed value, the direction of movement of the vehicle is not backward, and the absolute value of deceleration of the vehicle is larger than a second predetermined deceleration value that is larger than the first predetermined deceleration value.

19. A seat belt control method according to claim 18, wherein the controlling further comprises rotating the drive motor in the direction to unwind the seat belt after having rotated the drive motor in the direction to wind the seat belt for a predetermined time.

* * * * *